(12) United States Patent
Parnell

(10) Patent No.: US 7,941,046 B2
(45) Date of Patent: May 10, 2011

(54) PHOTOGRAPHIC AND VIDEOGRAPHIC CAMERA ACCESSORY AND METHOD OF USE THEREOF

(76) Inventor: Brendan H. Parnell, Atlanta, GA (US)

(*) Notice: Subject to any disclaimer, the term of this patent is extended or adjusted under 35 U.S.C. 154(b) by 204 days.

(21) Appl. No.: 12/156,579

(22) Filed: Jun. 2, 2008

(65) Prior Publication Data

US 2009/0297139 A1  Dec. 3, 2009

(51) Int. Cl.
*G03B 11/00* (2006.01)
(52) U.S. Cl. ........................................................ 396/544
(58) Field of Classification Search ............... 396/5, 544
See application file for complete search history.

(56) References Cited

U.S. PATENT DOCUMENTS

| | | | | |
|---|---|---|---|---|
| 4,172,485 A | * | 10/1979 | Mathieu | 206/316.2 |
| 4,176,701 A | * | 12/1979 | Welgan | 206/316.2 |
| 4,736,220 A | | 4/1988 | Heinzelmann | |
| 4,751,950 A | * | 6/1988 | Bock | 206/316.2 |
| 4,864,333 A | | 9/1989 | Barber | |
| 4,978,986 A | | 12/1990 | Hatch | |
| 5,094,647 A | | 3/1992 | Courtney | |
| 5,243,504 A | | 9/1993 | Sejzer | |
| 5,552,850 A | | 9/1996 | Matsumoto | |
| 5,632,052 A | * | 5/1997 | Michel | 5/655 |
| 5,848,310 A | | 12/1998 | Baker | |
| 5,950,017 A | | 9/1999 | Reff | |
| 5,991,547 A | | 11/1999 | Baiera et al. | |
| 6,264,379 B1 | | 7/2001 | Rydelek et al. | |
| 7,030,189 B2 | | 4/2006 | Masubuchi | |
| 7,092,624 B2 | | 8/2006 | Perry et al. | |
| 2006/0160060 A1 | * | 7/2006 | Algayed | 434/365 |
| 2007/0172223 A1 | | 7/2007 | Eberhardt | |
| 2008/0153075 A1 | * | 6/2008 | LaFiandra | 434/236 |
| 2009/0034958 A1 | * | 2/2009 | Dierenbach | 396/199 |
| 2009/0238548 A1 | * | 9/2009 | Smith et al. | 396/5 |

FOREIGN PATENT DOCUMENTS

JP  9244136  9/1997

OTHER PUBLICATIONS

Translation of JP Publication No. 07-209699; Camera with Binocular Finder; Miyasaka, Tetsuo; Publication Date: Aug. 11, 1995.*

* cited by examiner

*Primary Examiner* — Rodney E Fuller
*Assistant Examiner* — Fang-Chi Chang
(74) *Attorney, Agent, or Firm* — Woodcock Washburn LLP

(57) ABSTRACT

A photographic and/or videographic camera accessory that effectively attracts, captivates and directs the attention or line-of-sight of an infant substantially toward the camera lens.

21 Claims, 7 Drawing Sheets

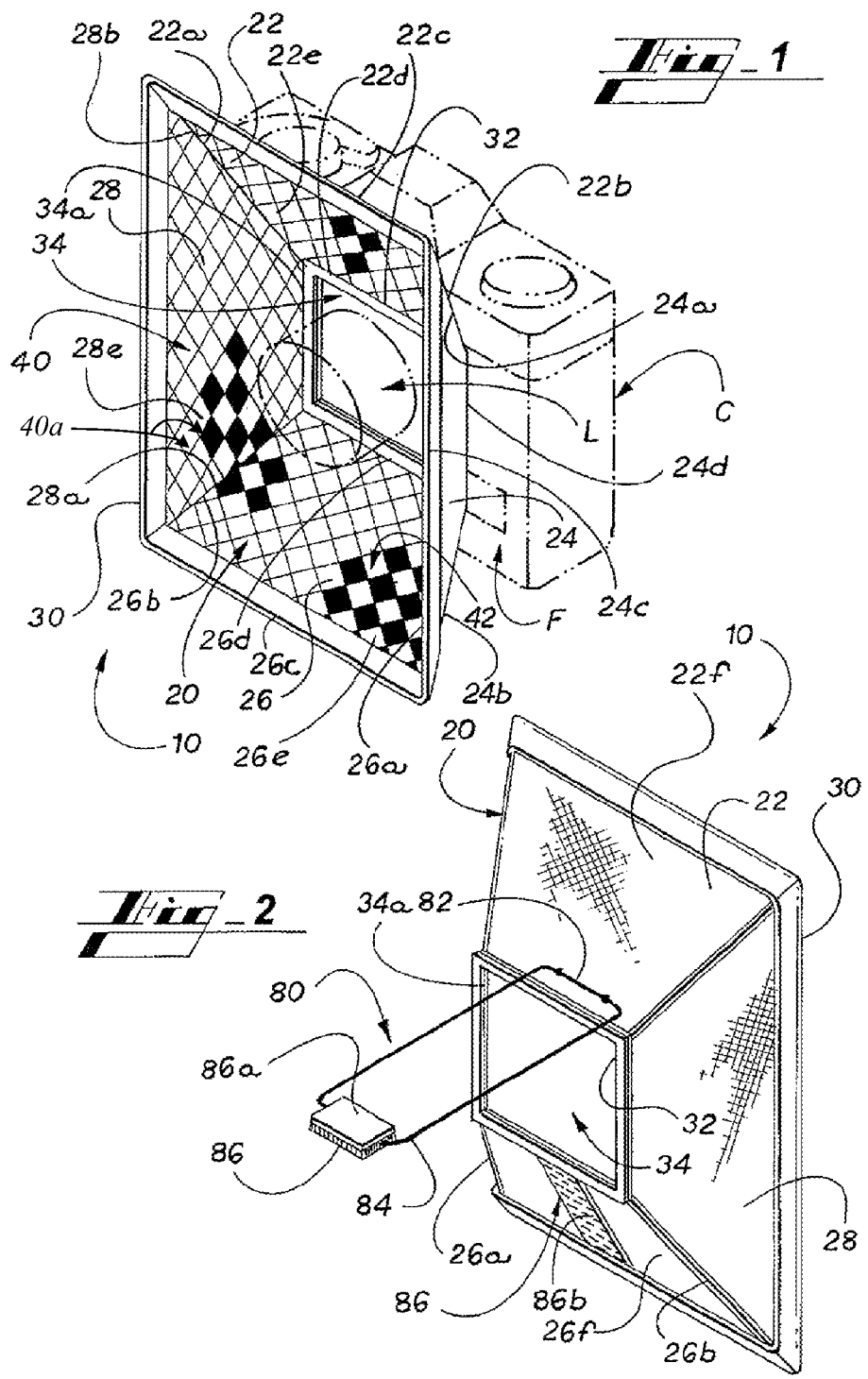

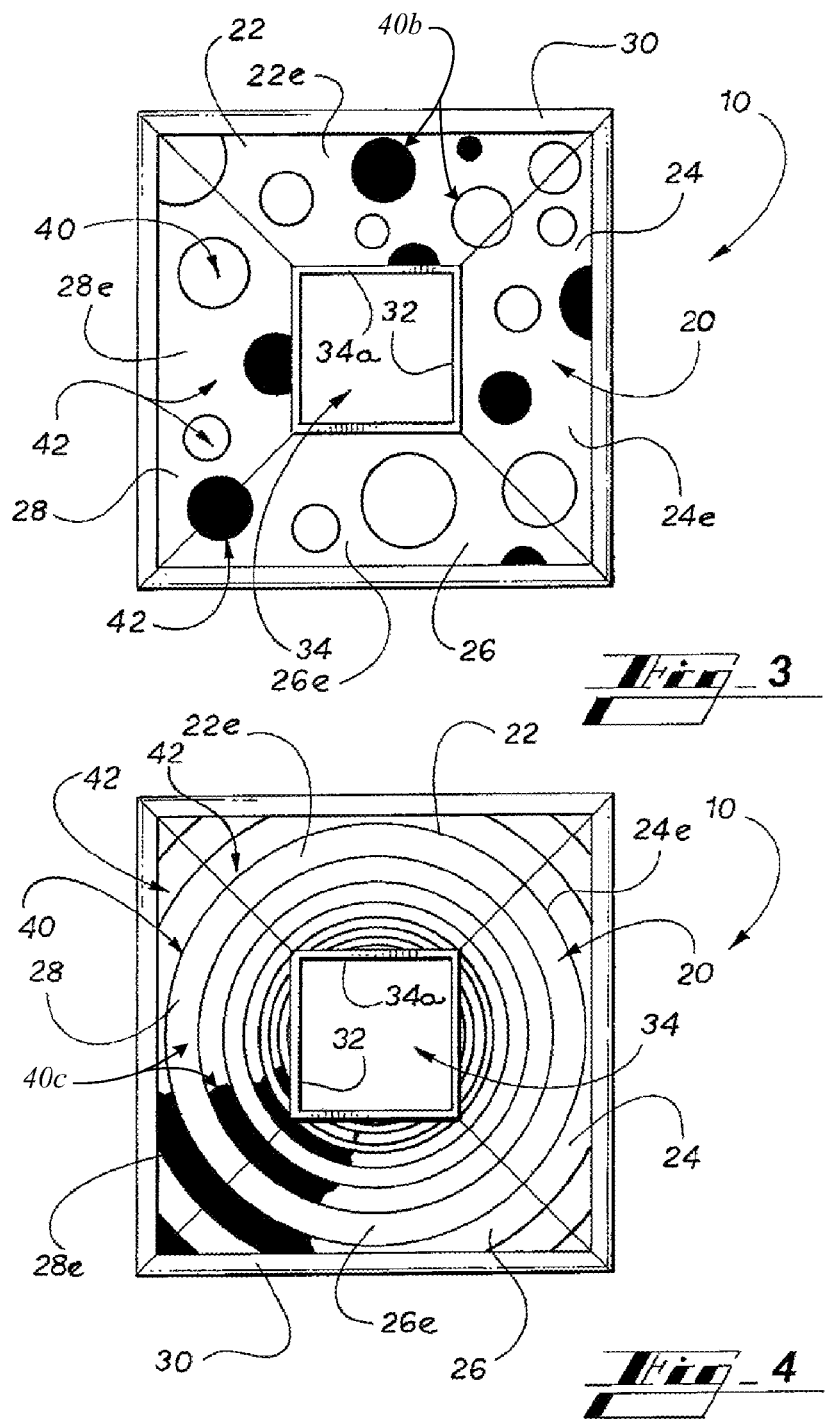

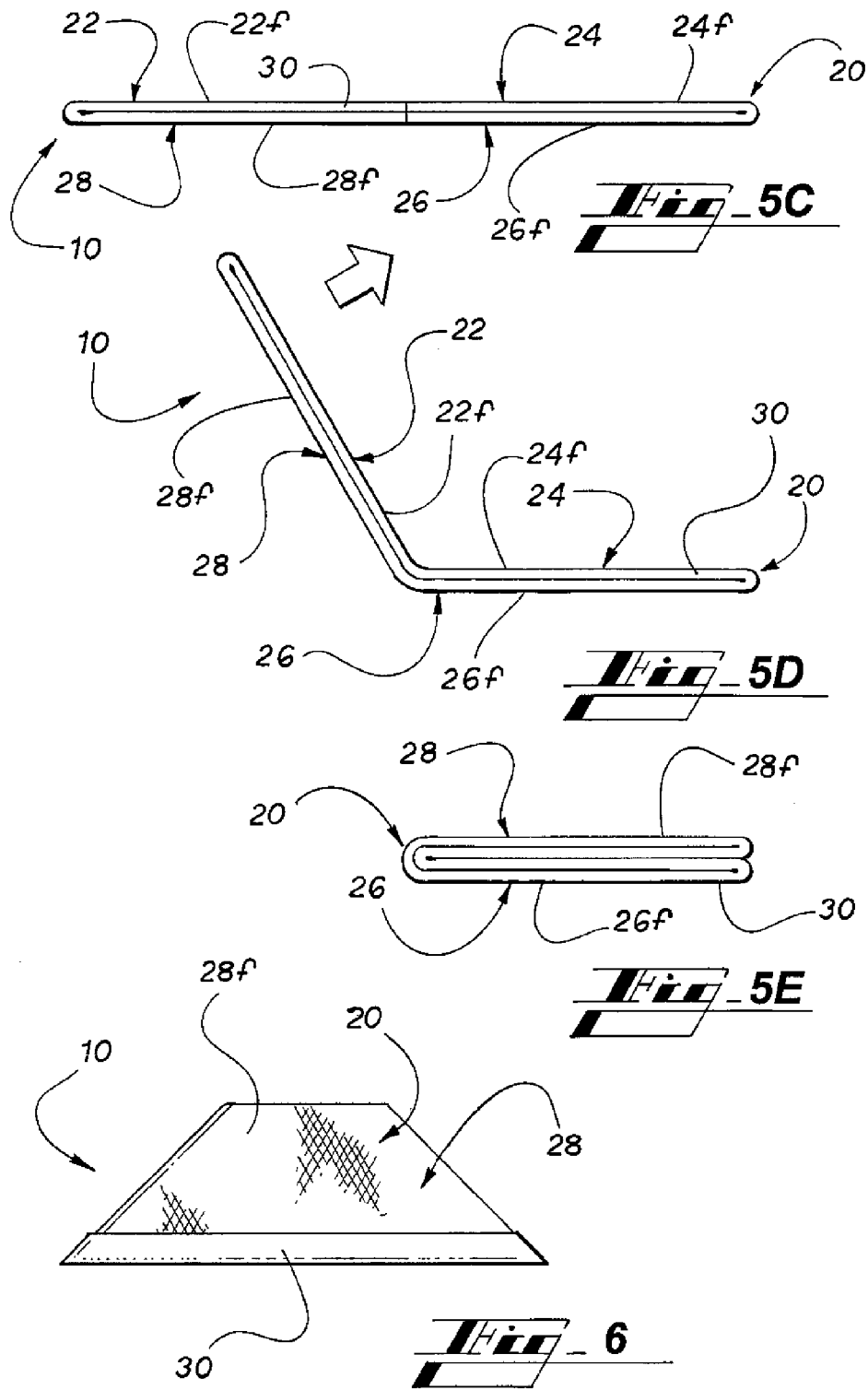

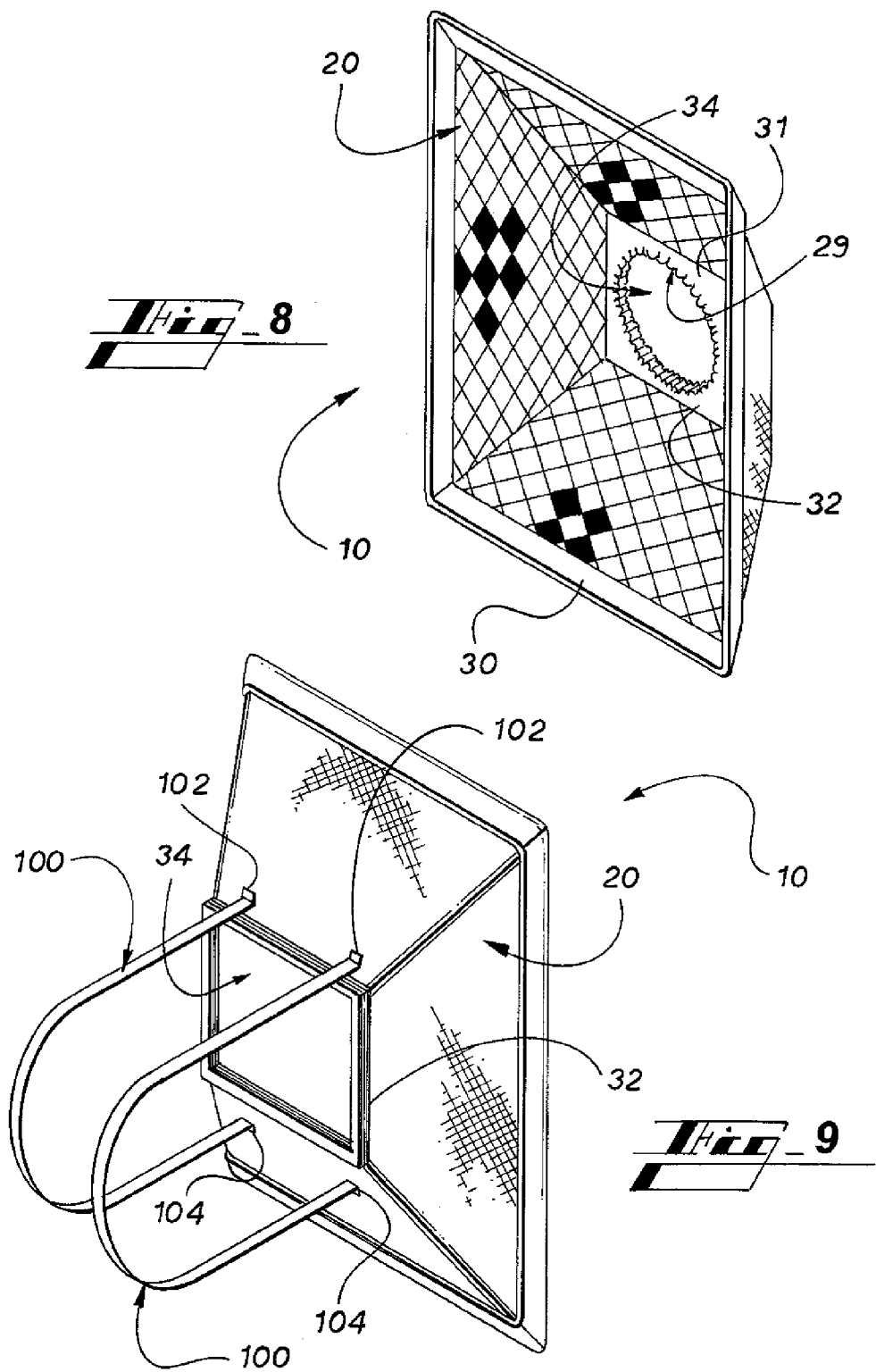

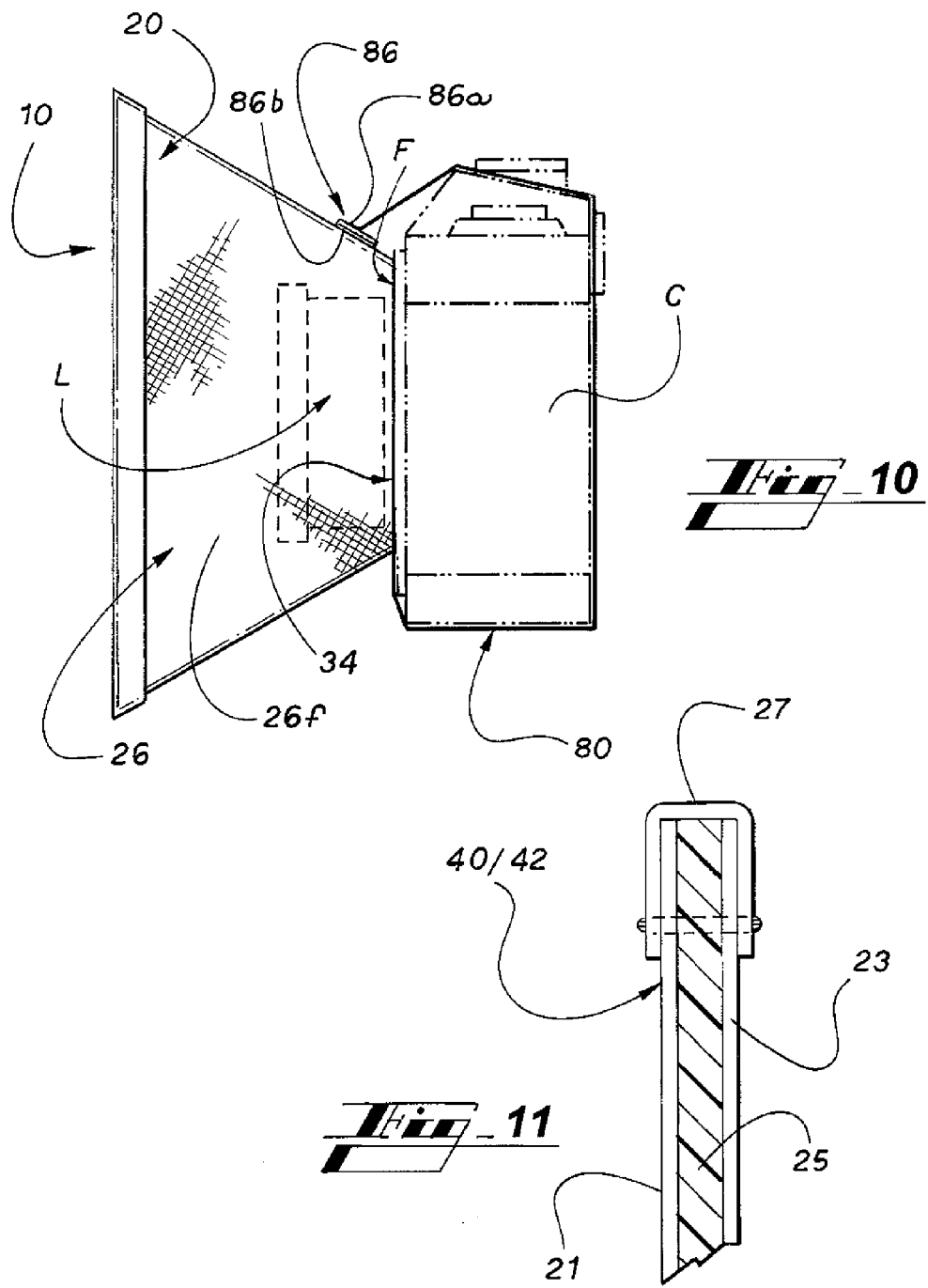

PHOTOGRAPHIC AND VIDEOGRAPHIC CAMERA ACCESSORY AND METHOD OF USE THEREOF

CROSS REFERENCE AND PRIORITY CLAIM TO RELATED APPLICATION

The present United States non-provisional patent application is related to, and hereby claims priority to, and the full benefit of, United States non-provisional application entitled "Photographic And Videographic Camera Accessory And Method Of Use Thereof" filed Jun. 2, 2008, on behalf of Brendan H. Parnell, having assigned Ser. No. 12/156,579, incorporated herein by reference.

TECHNICAL FIELD

The present invention relates generally to camera accessories, and more specifically to a photographic and/or videographic camera accessory for attracting, captivating and directing the attention or line-of-sight of an infant substantially toward the camera lens.

BACKGROUND OF THE INVENTION

Photographing or videotaping infants can present some difficulties. In particular, it can be exceedingly difficult to direct and capture the attention or line-of-sight of an infant toward the camera lens. Consequently, the resulting photograph or video recordation may yield a less than preferable image of the infant—i.e., no eye contact with the camera lens, and thus side shots of the infant's face, or even the top or back of the infant's head.

Accordingly, photographers and videographers (both professional and amateurs, alike) often utilize, and selectively employ, a series of diversionary peripherals or other attention-capturing devices in an effort to direct and maintain the attention, and thus line-of-sight, of the photo/videographed infant toward the camera lens. Such peripherals often include stuffed animals, hand puppets, noise-making devices (e.g., whistles, kazoos, rattles, etc.), flashing lights or other lighted devices, and/or simple directive voice commands. However, and although popularly employed by both professionals and non-professionals, such peripherals and associated methods of administration are ineffective, inefficient and inconvenient for a multiplicity of reasons.

For example, stuffed animals and hand puppets present the obvious disadvantage of preoccupying the one hand whilst attempting to effectively photograph or videotape with the other hand. In that regard, an assistant is often required to "work" the stuffed animal or hand puppet in an attempt to direct the focus of the infant toward the photo/videographer. Manifestly, such an assistant is not conveniently available to a parent (or other lay-photographer or casual videographer) simply seeking to capture images of his/her infant. Moreover, peripherals of this nature, although typically utilized within close proximity to the photo/videographer, obviously cannot be dangled or "worked" in front of, or in substantially close proximity to, the camera lens (at least not without effectively obscuring the view of the camera lens). Consequently, the infant's attention and line-of-sight is directed toward the assistant and/or the stuffed animal, and thus substantially away from the camera lens.

Unfortunately, noise-making devices and lighted devices, together with their associated techniques of use, suffer from largely the same inefficiencies and ineffectiveness attributable to stuffed animals and puppets. Primarily, the infant's attention and line-of-sight is drawn toward the locale or direction of noise or light, and thus effectively away from the camera lens. Furthermore, unfamiliar sounds from such noise-making devices, and/or bright, flashing lights, each otherwise intended to capture a hopeful expression of delight from the infant, may instead have the opposite and undesirable effect of frightening and upsetting the infant, resulting in an undesirable facial expression.

Still further, the foregoing peripherals, and associated techniques of use, are marked with an even more fundamental disadvantage. In particular, such available devices fail to accommodate for the limited visual spectrum and prematurely-developed ocular senses of infants, in general. Stated differently, the complex multi-color patterns and fanciful shapes and dimensions of puppets, stuffed animals, or the like, simply cannot be fully or effectively visually perceived, or otherwise focused upon, by the inherently premature visual senses of an infant. As such, the otherwise whimsical physical attributes of such peripherals, intended to capture and maintain an infant's line-of-sight toward the camera lens, are largely, if not entirely, lost upon the infant.

However, and during the early ocular developmental stage of infants in general, high-contrast colors (i.e., typically black, white and red), and some intermittent shades of grey, are within the immediate and perceivable visual spectrum of infants. Additionally, some simple geometric patterns (e.g., checkered, polka-dot, and spiral patterns) are also within the immediate and perceivable visual spectrum of infants. Indeed, and as the infant's eyesight develops, sensitivity to additional base colors and simple geometric shapes enhances. Consequently, a body or other physical media comprising such high-contrast colors presented in simple geometric shapes or patterns is highly effective in capturing, and maintaining thereupon, an infant's attention and line-of-sight.

Therefore, it is readily apparent that there is a need for a photographic and/or videographic camera accessory configured to operate within close proximity to the camera lens, and which accessory comprises a selected display of high-contrast colors presented in simple geometric shapes or patterns, to thereby effectively attract, captivate and direct the attention or line-of-sight of an infant substantially toward the camera lens.

BRIEF SUMMARY OF THE INVENTION

Briefly described, in a preferred embodiment, the present invention overcomes the above-mentioned disadvantages, and meets the recognized need for such an invention by providing a photographic and/or videographic camera accessory that effectively attracts, captivates and directs the attention or line-of-sight of an infant substantially toward the camera lens.

According to its major aspects and broadly stated, the present invention in its preferred form is a photographic and/or videographic camera accessory or device comprising, in general, a series of panes or panels defining the general body of the accessory, and wherein the panels further define a centrally-disposed aperture through which a camera lens may protrude, or otherwise be disposed to acquire an image. The rear face of the body preferably comprises a strap for securing the body to the forward face of the photographic (or video) camera, thereby maintaining position of the camera lens through the aperture of the body. Of particular importance, the forward faces of the panels preferably comprise a selected display of high-contrast colors presented in simple geometric shapes or patterns; thereby, effectively capturing and maintaining an infant's attention and line-of-sight toward the forward faces of the panels, and thus substantially toward the camera lens. The perimeter of the body preferably further comprises a border or margin, also of high-contrast color.

More specifically, in a preferred embodiment, the present invention is a photographic and/or videographic camera accessory or device comprising a substantially truncated pyramidal-shaped body structure defined by four cooperatively-engaged and substantially trapezoidal-shaped panes or panels, and which panels further preferably define a centrally disposed aperture in the body, through which a camera lens may protrude, or otherwise be disposed to acquire an image. In this latter regard, the body comprises such an outwardly flared or truncated pyramidal-shape, so as to not disrupt or otherwise obscure, in any capacity, the view of the camera lens protruding through the body aperture.

The body may be removably secured to the forward face of a selected camera (with the camera lens extending through the aperture) via an elastic strap affixed to the rear surface of the device, and preferably adjacent to the defining perimeter of the aperture. The free or distal end of the elastic strap preferably comprises a hook (or loop) portion of a general hook-and-loop fastener assembly, which hook portion is engageable to the corresponding loop (or hook) portion, also of a general hook-and-loop fastener assembly, disposed on the rear face of the body. In that regard, after positioning the body over the forward face of the camera, and thus the camera lens through the centrally disposed aperture thereof, the elastic securing strap may be brought over (or under) and around the camera body, and the hook portion thereof secured to the loop portion disposed on the rear face of the body.

Yet additionally, the perimeter of the centrally-disposed aperture may optionally comprise a ribbon or strip of non-skid rubberized material coated, affixed or otherwise applied thereover, so as to prevent shifting or slippage of the device when operatively engaged to the camera face.

Alternatively, and if the device is manufactured generally from fabric overlays disposed over rigid inner panels (as detailed hereinbelow), the perimeter of the centrally-disposed aperture may optionally comprise an elasticized band stitched, sewn or otherwise enclosed within the fabric margin or area surrounding and defining the central-disposed aperture; thereby, enabling the device to be easily slid onto and over, and thus maintained around, an SLR-type camera lens.

Most importantly, the forward faces of the body panels comprise a selected display of high-contrast, bold, or other bright colors, presented in simple geometric shapes or patterns, so as to attract the focus or attention of an infant or other young subject. In particular, the body panels preferably present the high-contrast colors of black and white, disposed in the simple geometric schema of, for exemplary purposes only, a checkered pattern, a polka-dot pattern, or a spiral pattern. As such, the selected simple geometric patterns and associated high-contrast colors of the present camera accessory, in general, signal or alert or otherwise draw the attention, and thus line-of-sight, of the infant's eyes toward the camera accessory as a whole, and thus substantially toward the camera lens; thereby, enabling the user to obtain pictures or video in which the infant's attention and eyes are directed toward the camera lens.

In addition to the selected high-contrast colored pattern, the border or perimeter of the forward face of the body may be similarly colored, or characterized with a different high-contrast color (i.e., red), for additional visual enhancement and overall effectiveness.

The device may be manufactured utilizing a composite structure comprising fabric overlays enclosing rigid or semi-rigid trapezoidal-shaped panels, which composite panel structures may then be assembled and constructed to form the truncated pyramidal-shaped body of the general device. Yet additionally, each abutting edge of each trapezoidal-shaped panel of the body is preferably suitably constructed so as to permit folding therealong, and thus enable compactability, storage and portability of the device.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 1 is a front perspective view of a camera accessory according to a preferred embodiment of the present invention, and shown in use;

FIG. 2 is a rear perspective view of a camera accessory according to a preferred embodiment of the present invention;

FIG. 3 is a front view of a camera accessory according to a preferred embodiment of the present invention;

FIG. 4 is a front view of a camera accessory according to a preferred embodiment of the present invention;

FIG. 5C is a front view of a camera accessory according to a preferred embodiment of the present invention, shown in a partially collapsed or folded configuration;

FIG. 5D is a front view of a camera accessory according to a preferred embodiment of the present invention, shown in a partially collapsed or folded configuration;

FIG. 5E is a front view of a camera accessory according to a preferred embodiment of the present invention, shown in a fully collapsed or folded configuration;

FIG. 6 is a side view of a camera accessory according to a preferred embodiment of the present invention, shown in a fully collapsed or folded configuration;

FIG. 8 is a front perspective view of a camera accessory according to an alternate embodiment of the present invention;

FIG. 9 is a rear perspective view of a camera accessory according to an alternate embodiment of the present invention;

FIG. 10 is a side view of a camera accessory according to a preferred embodiment of the present invention, and shown in use; and, FIG. 11 is a cross-sectional view of a fabric-covered panel according to an embodiment of the present invention.

DETAILED DESCRIPTION OF THE PREFERRED AND SELECTED ALTERNATIVE EMBODIMENTS

Figure 5A:
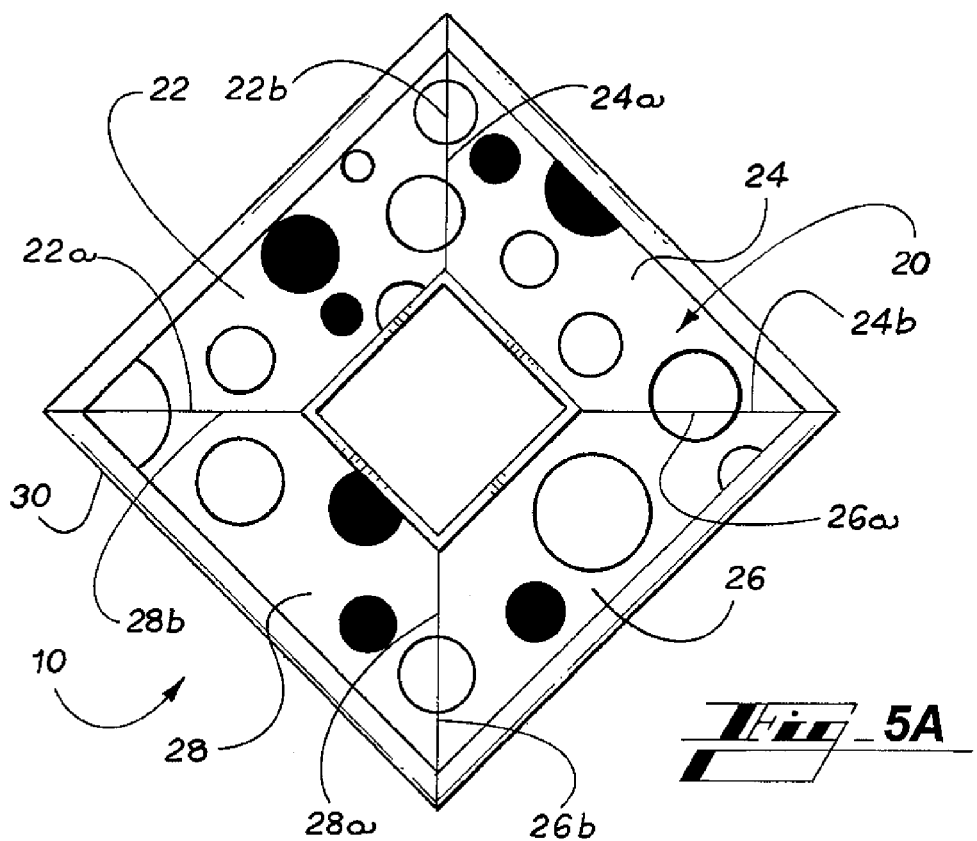
FIG. 5A is a front view of a camera accessory according to a preferred embodiment of the present invention, shown in an unfolded configuration.

In describing the preferred and selected alternate embodiments of the present invention, as illustrated in FIGS. 1-11, specific terminology is employed for the sake of clarity. The invention, however, is not intended to be limited to the specific terminology so selected, and it is to be understood that each specific element includes all technical equivalents that operate in a similar manner to accomplish similar functions.

Referring generally now to FIGS. 1-11, the present invention in a preferred embodiment is a photographic and/or videographic camera accessory or device 10, generally comprising body 20, indicia or pattern 40, and securing strap 80.

More specifically, body 20 is a substantially truncated pyramidal-shaped structure defined by panes or panels 22, 24, 26, 28. Panels 22, 24, 26, 28 each preferably comprise a substantially isosceles trapezoidal shape, and wherein each of panels 22, 24, 26, 28 are cooperatively-engaged or adjoined, each to the other, at their respective non-parallel side edges 22a, 22b, 24a, 24b, 26a, 26b, 28a, 28b. In such a preferred configuration, body 20 is provided with its characteristic truncated pyramidal-shaped structure. Moreover, as described in further detail hereinbelow with reference to the Figures hereof, and depending upon the selected materials and methods of manufacture of device 10 generally, non-parallel side edges 22a, 22b, 24a, 24b, 26a, 26b, 28a, 28b, of respective panels 22, 24, 26, 28, may provide for easy collapsibility, folding and storage of body 20.

Additionally, parallel side edges 22c, 22d, 24c, 24d, 26c, 26d, 28c, 28d, of respective panels 22, 24, 26, 28, collectively provide for the defining outer perimeter or border 30 of body 20, and inner perimeter or border 32 of body 20. In that regard, inner perimeter 32 thereby further defines centrally-disposed aperture 34 of body 20, through which camera lens L may protrude, or otherwise be disposed to acquire an image. Most preferably, the general outwardly flared or truncated pyramidal-shape of body 20, as described herein, effectively functions to not disrupt or otherwise obscure, in any capacity, the view of a camera lens protruding through the aperture 34, as further detailed herein.

Referring now more specifically to FIGS. 1, 3, 4, 7, 8, each of forward faces 22e, 24e, 26e, 28e of panels 22, 24, 26, 28, preferably comprise a uniform or randomized pattern 40 disposed thereover, which pattern 40 further preferably comprises a high-contrast color schema 42. Pattern 40 and high-contrast color schema 42, disposed generally over panels 22, 24, 26, 28, preferably function to attract, direct and maintain the focus or attention, and thus line-of-sight, of an infant or other young subject toward panels 22, 24, 26, 28, and thus substantially toward a camera lens protruding through aperture 34 of body 20, when device 10 is in use, as detailed hereinbelow.

With now more specific reference to FIGS. 1, 3, 4, forward faces 22e, 24e, 26e, 28e of body panels 22, 24, 26, 28, preferably comprise the high-contrast color schema 42 of black and white (see, FIGS. 1, 3, 4, generally), disposed in the simple pattern 40 of, for exemplary purposes only, a uniform checkered pattern 40a (see, FIG. 1), a randomized polka-dot pattern 40b (see, FIG. 3), or a spiral pattern 40c (see, FIG. 4). As such, the selected pattern 40, whether of specific patterns 40a, 40b, 40c illustrated herein, or of other similar or alternate patterns, together with the associated high-contrast color schema 42 of device 10 generally, collectively function to signal or alert or otherwise draw the attention, and thus line-of-sight, of the infant's eyes toward panels 22, 24, 26, 28 of body 20 as whole, and thus substantially toward camera lens L; thereby, enabling a user of device 10 to obtain pictures or video in which the infant's attention and eyes are directed toward the camera lens L of photographic camera C (see, FIG. 1) or video camera VC (see, FIG. 7).

In addition to the selected high-contrast colored schema 42 of pattern 40, outer border or perimeter 30 of body 20 may be similarly colored, or characterized with a different high-contrast color (e.g., red), for additional visual enhancement and overall effectiveness of device 10.

Referring now more specifically to FIGS. 1, 2, 7, 10, body 20 may be removably secured to the forward face F of either photographic camera C or video camera VC, and with camera lens L thereof extending through aperture 34. Specifically, device 10 further comprises elasticized securing strap 80, in which terminal end 82 of strap 80 is securely affixed to rear face 22f of panel 22 of body 20, preferably adjacent to the defining inner perimeter 32 of aperture 34 of body 20. The free or distal end 84 of securing strap 80 preferably comprises a hook (or loop) portion 86a of a general hook-and-loop fastener assembly 86, which hook portion 86a is engageable to the corresponding loop (or hook) portion 86b, also of general hook-and-loop fastener assembly 86, and which loop portion 86b is preferably securely affixed to rear face 26f of panel 26 of body 20, preferably adjacent to the defining inner perimeter 32 of aperture 34 of body 20. In that regard, after positioning body 20 over the forward face F of either camera C or VC, and thus camera lens L through centrally-disposed aperture 34 of body 20, elasticized securing strap 80 may be brought over (or under) and around the body of either camera C or VC, whereupon hook portion 86a of strap 80 may be removably secured to loop portion 86b disposed on panel 22.

Yet additionally, and with continued reference to FIGS. 1-4, 7, inner perimeter 32 defining centrally-disposed aperture 34 of body 20 may optionally comprise a continuous (or discontinuous) ribbon or strip of non-skid rubberized material 34a coated, affixed or otherwise applied over and/or around inner perimeter 32. Accordingly, non-skid rubberized material 34a preferably provides a frictional abutment generally between body 20 and camera C (or video camera VC), so as to prevent shifting or slippage of device 10 when operatively engaged thereto.

Figure 5B:
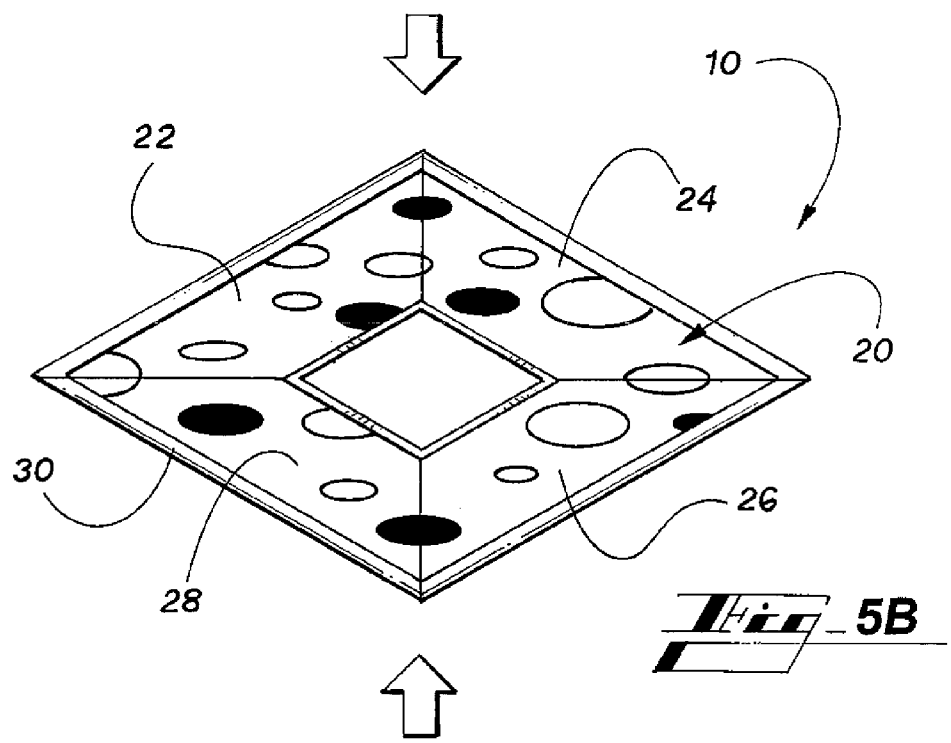
FIG. 5B is a front view of a camera accessory according to a preferred embodiment of the present invention, shown in a partially collapsed or folded configuration.
Figure 7:
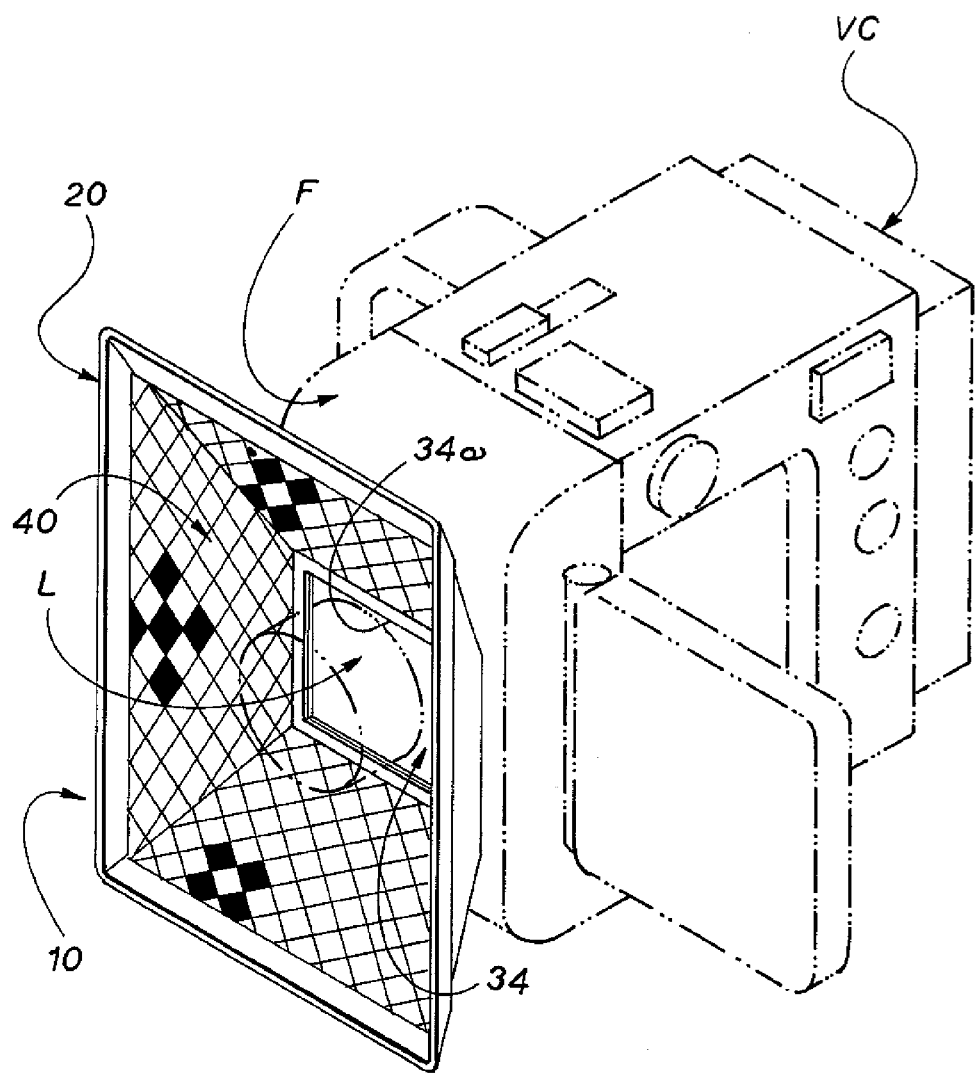
FIG. 7 is a front perspective view of a camera accessory according to a preferred embodiment of the present invention, and shown in use.

Panels 22, 24, 26, 28 of device 10 may be manufactured utilizing an inner and outer fabric layer 21, 23, respectively, between which a rigid or semi-rigid trapezoidal-shaped intermediary sheet 25 of plastic, cardboard, or other suitable material capable of maintaining shape, may be appropriately encased via sewing or stitching. An example of such a "fabric-covered-panel" composite structure is illustrated in FIG. 11. Each panel 22, 24, 26, 28 may then be configured and sewn or otherwise stitched along their respective non-parallel side edges 22a, 22b, 24a, 24b, 26a, 26b, 28a, 28b, to thus imbue body 20 with its characteristic truncated pyramidal-shaped structure. In such an embodiment, each sewn or stitched abutting side edge 22a, 22b, 24a, 24b, 26a, 26b, 28a, 28b, of respective trapezoidal-shaped panels 22, 24, 26, 28, preferably enables body 20, and device 10 generally, to be collapsed and folded for ease of storage and portability. FIGS. 5A-6 illustrates the manner in which device 10 would be progressively collapsed and folded.

Moreover, in such a fabric-covered-panel embodiment, the above-described pattern 40 and associated color schema 42 may be printed, dyed, silk-screened, or otherwise impressed over inner fabric layer 21, according to known fabric manufacturing processes. Yet additionally, outer border or perimeter 30 may be provided in the form of a fabric bias or binding 27, suitably colored with a selected high-contrast color (e.g., white, black, red, etc.). An example of such a fabric bias or binding 27 constituting border 30 is illustrated together with the composite fabric-covered-panel structure of FIG. 11.

Still further, and in such a fabric-covered-panel embodiment, the ribbon or strip of non-skid rubberized material 34a may be sewn or stitched to inner perimeter 32 defining centrally-disposed aperture 34 of body 20, or again may be provided in the form of a coating applied over and/or around inner perimeter 32. Yet additionally, terminal end 82 of securing strap 80 may be sewn or stitched to outer fabric layer 23 of rear face 22f of panel 22, and wherein loop portion 86b of a general hook-and-loop fastener assembly 86 may be sewn or stitched to outer fabric layer 23 of rear face 26f of panel 26.

Alternatively, and with specific reference to FIG. 8, and in such a fabric-covered-panel embodiment, inner perimeter 32 of centrally-disposed aperture 34 may optionally comprise an elasticized band 29 stitched, sewn or otherwise enclosed within fabric margin or area 31 surrounding and defining centrally-disposed aperture 34; thereby, enabling device 10 to be easily slid onto and over, and thus maintained around, an SLR-type camera lens, or other photographic cameras or video cameras comprising a protruding lens housing. In such an embodiment, securing strap 80 could optionally be entirely eliminated.

In another fabric-covered-panel embodiment, and with specific reference to FIG. 9, securing strap 80 could be replaced with looped elasticized straps 100, in which the terminal ends 102 and 104 of each such looped elasticized strap 100 are stitched to outer fabric layer 23, proximate inner perimeter 32 defining aperture 34. In such an embodiment, camera C (or video camera VC) may simply be slipped through looped straps 100 of body 20, whereupon camera lens L may be situated through aperture 34, and wherein body 20 is firmly held against the forward face of camera C (or video camera VC) via the elastic tension provided by elasticized looped straps 100.

In still another embodiment, panels 22, 24, 26, 28 of body 20 may be entirely manufactured with a suitable rigid or semi-rigid plastic substrate. In such an embodiment, the preferred substantially truncated pyramidal-shape of plastic body 20 may be provided via conventional vacuum forming processes, injection molding, or other known plastic product forming processes. Furthermore, and in such an embodiment, pattern 40, associated color schema 42, and colored outer border 30 may be suitable printed, silk-screened, embossed or otherwise formed over each of forward faces 22e, 24e, 26e, 28e of panels 22, 24, 26, 28. Moreover, ribbon or strip of non-skid rubberized material 34a may be integrally-formed with body 20, or otherwise subsequently applied over and/or around inner perimeter 32 via known rubber coating techniques, or may be provided as a grooved, friction-fit rubber overlay (i.e., such as a gasket, ring, or the like). In this further embodiment, it is contemplated that the plastic form body 20 could be non-collapsible or non-foldable, or alternatively could be collapsible and foldable via manufacturing body 20 with thin, flexible plastic seams or "hinges" disposed between side edges 22a, 22b, 24a, 24b, 26a, 26b, 28a, 28b, of respective panels 22, 24, 26, 28. Terminal end 82 of securing strap 80 may be appropriately affixed to body 20 (at the locales described herein) via integrally-formed plastic retention clips, retaining channels, or like, disposed on any one of the rear faces of panels 22, 24, 26, 28. In this further regard, hook-and-loop fastener assembly 86 may be utilized or replaced with ring-and-clasp assemblies, magnetic assemblies, or the like.

In yet another embodiment, panels 22, 24, 26, 28 of body 20 may be entirely manufactured with a rigid or semi-rigid cardboard or heavy-weight cardstock. In such an embodiment, the substantially truncated pyramidal-shape of body 20 may be provided via conventional cardboard product forming processes, and wherein pattern 40, associated color schema 42, and colored outer border 30 may be suitable printed, silk-screened, or otherwise formed over each of forward faces 22e, 24e, 26e, 28e of panels 22, 24, 26, 28. Moreover, the ribbon or strip of non-skid rubberized material 34a may be applied over and/or around inner perimeter 32 via known rubber coating techniques, or again may be provided as a grooved, friction-fit rubber overlay (i.e., such as a gasket, ring, or the like). In this further embodiment, it is contemplated that the cardboard form body 20 could be non-collapsible or non-foldable, or alternatively could be collapsible and foldable by imbuing cardboard body 20, according to known cardboard product manufacturing processes, with integral folding seams, or fiber-tape seams or "hinges", disposed between side edges 22a, 22b, 24a, 24b, 26a, 26b, 28a, 28b, of respective panels 22, 24, 26, 28. In this further embodiment, terminal end 82 of securing strap 80 may be appropriately affixed to cardboard body 20 (at the locales described herein) via retention clips, tapes, or like, disposed on any one of the rear faces of panels 22, 24, 26, 28. In this further regard, hook-and-loop fastener assembly 86 may be utilized, or again replaced with ring-and-clasp assemblies, magnetic assemblies, or the like.

In an alternate embodiment, panels 22, 24, 26, 28 may each be formed as a plastic, transparent pocket, with the mouth of each such pocket forming the outer perimeter 30 of body 20. Each such pocket may be suitably dimensioned to receive any one of a series of interchangeable inserts comprising various simple to complex patterns and color schema disposed thereover. Such inserts may allow the user of such an alternate device 10 to accommodate for the developing visual spectrum of an infant or other young child.

It should be recognized that pattern 40 described herein is not limited to the illustrated patterns 40a, 40b, 40c of FIGS. 1, 3, 4. Yet additionally, color schema 42 is further not limited to the high-contrast colors of black, white and/or red, as also described herein. Instead, the present invention specifically contemplates that the terms "indicia" or "pattern", as used, described and claimed herein, may include patterns of random or uniform design, geometric or non-geometric design, combinations of the foregoing, and any of which may be presented over panels 22, 24, 26, 28 in a continuous or discontinuous manner, together with any selected combination of high-contrast colors. Accordingly, such additionally contemplated patterns may include, without limitation, cow spots, zebra stripes, plaid, crosshatches, paisley, zig-zags, swirls, stripes, "Xs" and "Os", snowflakes, flowers, horseshoes, hearts, semi-circles, moons and stars, diamonds, and the like. Additional high-contrast color combinations may include, without limitation, red and green, blue and orange, purple and yellow, and so on. Indeed, the array of patterns and colors may be selectively utilized to implement the intended function of device 10, in general, and/or to further accommodate for the progressive ocular development of an infant or young child.

It should be further recognized that the image recording devices illustrated in the Figures hereof and constituting photographic camera C and video camera VC, are not exhaustive of the type of "cameras" or image recording devices that may be equipped with device 10. Indeed, any available image recording device may be equipped with an appropriately sized device 10, together with suitably sized securing straps, or other securing means. In this further regard, it is contemplated that device 10 may be manufactured to comprise any size or shape, as the circumstances may dictate. To that extent, the flared or truncated pyramidal-shaped body 20 may be replaced with a concave dish-like configuration, a fan-like configuration, a flat circular or polygonal shape, a single or multi-panel arrangement, or the like. Indeed, body 20 may be manufactured to any acceptable shape or size, so long as the forward face thereof comprises the indicia or pattern 40 and color schema 42 described or otherwise contemplated herein, together with a sufficient (open or closed perimetered) clearance or aperture in which, or through which, camera lens L may protrude, or otherwise be disposed to acquire an image. In this latter regard, aperture 34 need not comprise the squared configuration as illustrated in the Figures hereof, but may instead comprise any suitable shape (i.e., circular, rectangular, oval, etc.) to accommodate any selected camera lens L of any selected camera C and/or VC.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A camera accessory removably securable to a camera, proximate the camera lens thereof, said accessory comprising:
    a body, said body consisting essentially of a truncated pyramidal shape, said body comprising a forward face, a rear face, a rearwardly disposed flange, and an aperture through said flange through which the camera lens of the camera may extend, said body substantially surrounding the camera lens when installed upon a camera, said rearwardly disposed flange abutting a surface of the camera adjacent the camera lens when installed upon a camera;
    a pattern applied to and disposed over at least a portion of said forward face of said body, said pattern comprising a high-contrast color schema; and,
    a means for securing said body to the camera.

2. The camera accessory of claim 1, wherein said body comprises a plurality of adjoined panels, said adjoined panels at least partially defining said forward face and said rear face of said body.

3. The camera accessory of claim 1, wherein said panels are rigid.

4. The camera accessory of claim 1, wherein said panels are semi-rigid.

5. The camera accessory of claim 1, wherein said body comprises an outer border, said outer border comprising at least one color of said high-contrast color schema.

6. The camera accessory of claim 1, wherein said body comprises an outer border, said outer border comprising a color different from said high-contrast color schema.

7. The camera accessory of claim 1, wherein said body comprises an inner border defining said aperture.

8. The camera accessory of claim 1, wherein said body comprises an inner border defining said aperture, said inner border comprising a non-skid rubberized material disposed thereabout.

9. The camera accessory of claim 1, wherein said body comprises a plurality of adjoined fabric-covered panels, said adjoined fabric-covered panels at least partially defining said forward face and said rear face of said body.

10. The camera accessory of claim 9, wherein each said panel of said fabric-covered panels are rigid.

11. The camera accessory of claim 9, wherein each said panel of said fabric-covered panels are semi-rigid.

12. The camera accessory of claim 9, wherein said body comprises a fabric outer border, said fabric outer border comprising at least one color of said high-contrast color schema.

13. The camera accessory of claim 9, wherein said body comprises a fabric inner border defining said aperture, said fabric inner border comprising an elasticized band stitched therewithin.

14. The camera accessory of claim 1, wherein said high-contrast color schema is black and white.

15. The camera accessory of claim 1, wherein said high-contrast color schema comprises at least two high contrast colors selected from the group consisting of black, white, red, blue, orange, purple, and yellow.

16. The camera accessory of claim 1, wherein said pattern is selected from the group consisting of random patterns, uniform patterns, geometric patterns, non-geometric patterns, continuous patterns, discontinuous patterns, and combinations thereof.

17. The camera accessory of claim 1, wherein said securing means comprises at least one elasticized strap, said strap comprising a terminal end and distal end, wherein said terminal end is affixed to said rear face of said body, and wherein said distal end comprises a first attachment means removably securable to a corresponding second attachment means, said second attachment means affixed to said rear face of said body.

18. The camera accessory of claim 1, wherein said securing means comprises at least one looped elasticized strap affixed at both ends thereof to said rear face of said body.

19. The camera accessory of claim 1, wherein said body is foldable.

20. A method for attracting, directing and captivating the attention and line-of-sight of an infant substantially toward a camera lens of a photographic or videographic camera, said method comprising the step of:
    removably securing to the camera, and within close proximity to the camera lens thereof, a structure comprising a body, said body consisting essentially of a truncated pyramidal shape, said body comprising a forward face, a rear face, a rearwardly disposed flange, and an aperture through said flange through which the camera lens of the camera may extend, said body substantially surrounding the camera lens when installed upon a camera, said rearwardly disposed flange abutting a surface of the camera adjacent the camera lens when installed upon a camera; a pattern applied to and disposed over at least a portion of said forward face of said body, and wherein said pattern comprises a high-contrast color schema; and,
    attracting the infant's attention and thus line-of-sight toward the camera, and thus toward said forward face of said structure and said pattern and said high-contrast color schema thereof, and thus substantially toward the camera lens of the camera.

21. A camera accessory removably securable to a camera, proximate the camera lens thereof, said accessory comprising:
    a body, said body consisting essentially of a truncated pyramidal shape, said body comprising a forward face, a rear face, a rearwardly disposed flange, and an aperture through said flange through which the camera lens may acquire an image, said body substantially surrounding the camera lens when installed upon the camera, said rearwardly disposed flange abutting a surface of the camera adjacent the camera lens when installed; and,
    a pattern applied to and disposed over at least a portion of said forward face of said body, said pattern comprising a high-contrast color schema.

* * * * *